US012679727B2

(12) United States Patent
Yoo et al.

(10) Patent No.: US 12,679,727 B2
(45) Date of Patent: Jul. 14, 2026

(54) NATURAL GAS REFORMING SYSTEM AND PROCESS THEREOF

(71) Applicant: DOOSAN ENERBILITY CO., LTD, Changwon (KR)

(72) Inventors: Jeong Seok Yoo, Yongin (KR); You Seok Kim, Yongin (KR); Byoung Youn Kim, Yongin (KR)

(73) Assignee: DOOSAN ENERBILITY CO., LTD, Changwon (KR)

( * ) Notice: Subject to any disclaimer, the term of this patent is extended or adjusted under 35 U.S.C. 154(b) by 951 days.

(21) Appl. No.: 17/819,977

(22) Filed: Aug. 16, 2022

(65) Prior Publication Data

US 2023/0166968 A1      Jun. 1, 2023

(30) Foreign Application Priority Data

Sep. 14, 2021 (KR) ......................... 10-2021-0122700

(51) Int. Cl.
| | |
|---|---|
| *C01B 3/38* | (2026.01) |
| *C25B 1/042* | (2021.01) |
| *C25B 1/23* | (2021.01) |
| *C25B 1/50* | (2021.01) |
| *C25B 15/08* | (2006.01) |

(52) U.S. Cl.
CPC ................ *C01B 3/38* (2013.01); *C25B 1/042* (2021.01); *C25B 1/23* (2021.01); *C25B 1/50* (2021.01); *C25B 15/081* (2021.01); *C01B 2203/0233* (2013.01); *C01B 2203/0283* (2013.01); *C01B 2203/043* (2013.01);
(Continued)

(58) Field of Classification Search
CPC .............. C01B 3/38; C01B 2203/0233; C01B 2203/0283; C01B 2203/043; C01B 2203/0827; C01B 2203/1241; C01B 2203/80; C01B 2203/0894; C01B 3/56; C01B 2203/0475; C01B 2203/148; C01B 3/48; C01B 3/50; C25B 1/042; C25B 1/23; C25B 1/50; C25B 15/081; C25B 1/04; Y02E 60/36; Y02P 20/133
See application file for complete search history.

(56) References Cited

U.S. PATENT DOCUMENTS

2021/0284530 A1* 9/2021 Jahnke .............. H01M 8/04007

FOREIGN PATENT DOCUMENTS

| | | |
|---|---|---|
| CN | 108604697 A | 9/2018 |
| JP | 2011132103 A | 7/2011 |

(Continued)

OTHER PUBLICATIONS

Ferrario "A System Integration Analysis of a Molten Carbonate Electrolysis Cell as an Off-Gas Recovery System in a Steam-Reforming Process of an Oil Refinery", frontiers in Energy Research, vol. 9 (Year: 2021).*

(Continued)

*Primary Examiner* — Anthony J Zimmer
*Assistant Examiner* — Jaanzeb C Raja
(74) *Attorney, Agent, or Firm* — Harvest IP Law, LLP

(57) ABSTRACT

The present disclosure relates to a natural gas reforming system capable of reducing, by using a co-electrolysis device, the emission amount of carbon dioxide produced by reforming natural gas, of supplying heat to a reformer through syngas produced by the co-electrolysis, and of producing additional hydrogen, and a process thereof.

6 Claims, 3 Drawing Sheets

(52) U.S. Cl.
CPC ................. *C01B 2203/0827* (2013.01); *C01B 2203/1241* (2013.01); *C01B 2203/80* (2013.01)

(56) References Cited

FOREIGN PATENT DOCUMENTS

| | | |
|---|---|---|
| KR | 10-0514178 B1 | 9/2005 |
| KR | 101379377 B1 | 4/2014 |
| KR | 20200114809 A | 10/2020 |
| KR | 20210086015 A | 7/2021 |
| WO | 2017144403 A1 | 8/2017 |

OTHER PUBLICATIONS

A System Integration Analysis of a Molten Carbonate Electrolysis Cell as an Off-Gas Recovery System in a Steam-Reforming Process of an Oil Refinery.
Hydrogen energy and fuel cell electric automotive.
An Office Action issued by the Chinese Patent Office.
"A System Integration Analysis of a Molten Carbonate Electrolysis Cell . . . " Apr. 21, 2021, Andrea Monforti Ferrario et al.
Search Report dated Feb. 14, 2023 by the PTO(EP).
OA dated Mar. 14, 2023 by the PTO(KR).

* cited by examiner

NATURAL GAS REFORMING SYSTEM AND PROCESS THEREOF

CROSS-REFERENCE TO RELATED APPLICATIONS

The present application claims priority to Korean Patent Application No. 10-2021-0122700, filed on Sep. 14, 2021, the entire contents of which is incorporated herein for all purposes by this reference.

BACKGROUND OF THE INVENTION

Field of the Invention

The present disclosure relates to a natural gas reforming system and a process thereof and more particularly to a natural gas reforming system and process capable of reducing emission amount of carbon dioxide while producing additional hydrogen, by way of using a co-electrolysis device.

Description of the Related Art

Due to the greenhouse gas emission and global warming problem, there is an increasing need for development of renewable energy and its spread, which is capable of replacing fossil fuel. Attention is also paid to hydrogen that is one of clean energy sources. Importance of hydrogen is increasing as a future energy source because it has a high energy density. Hydrogen is one of the elements that are the most abundant on earth and exist in various forms such as fossil fuel, biomass, water, etc. It is important to produce hydrogen in a manner of minimizing the influence on the environment as well as in an economically efficient manner. Hydrogen production methods are divided into traditional production methods using a fossil fuel reforming reaction and renewable production methods using biomass and water. The hydrogen production using fossil fuel can be made by a thermochemical method such as a wet reforming reaction, an autothermal reforming reaction, a partial oxidation reaction, a gasification reaction, etc. Nowadays, hydrogen produced by a reformer is the most common in a hydrogen market.

Certain conventional method of producing hydrogen includes using hydrogen PSA off-gas of coke oven gas (COG). However, in such conventional method of producing hydrogen, carbon dioxide is inevitably emitted in the process of hydrogen production using fossil fuels.

As such, more and more attention is being paid to renewable energy domestically and internationally due to strong environmental regulations, particularly a greenhouse gas quota system. Therefore, it is important to develop an efficient and economical clean energy production technology based on natural gas.

One of clean energy production technologies includes capturing carbon dioxide without emitting carbon dioxide by reforming fossil fuels. However, a separate storage space for separating and storing the captured carbon dioxide is required. Also, the bigger the capacity of a reformer is, the more difficult it is to have a storage space.

The technical problem to be overcome in this document is not limited to the above-mentioned technical problems. Other technical problems not mentioned can be clearly understood from those described below by a person having ordinary skill in the art.

SUMMARY OF THE INVENTION

The present disclosure provides a natural gas reforming system capable of reducing, by using a co-electrolysis device, the emission amount of carbon dioxide produced by reforming natural gas, of supplying heat to a reformer through syngas produced by the co-electrolysis, and of producing additional hydrogen, and a process thereof.

The technical problem to be overcome in this document is not limited to the above-mentioned technical problems. A person having ordinary skill in the art would understand that the present disclosure would overcome other technical problems as well, which are not specifically mentioned herein.

One embodiment is a natural gas reforming system including: a reformer configured to convert, through a steam reforming reaction, natural gas into reformed gas that comprises hydrogen and carbon monoxide; a steam generator configured to generate steam by heat-exchanging with combustion gas that is discharged from a burner of the reformer; a water gas shift reactor configured to convert the carbon monoxide and steam of the reformed gas into hydrogen and carbon dioxide through a water gas shift reaction; a hydrogen separator configured to separate the hydrogen from the gas supplied from the water gas shift reactor; a carbon dioxide separator configured to separate the carbon dioxide from the gas which is supplied by the hydrogen separator and from which the hydrogen has been separated; and a co-electrolysis device configured to be supplied with the steam and the carbon dioxide separated by the carbon dioxide separator and produces oxygen and syngas comprising hydrogen and carbon monoxide, through a co-electrolytic reaction.

According to the embodiment, the steam generated by the steam generator may be supplied to the reformer, the water gas shift reactor, and the co-electrolysis device, respectively.

According to the embodiment, at least a portion of the syngas produced by the co-electrolysis device may be supplied to the burner of the reformer and may be combusted.

According to the embodiment, the rest of the syngas produced by the co-electrolysis device may be supplied to a front end of the water gas shift reactor.

According to the embodiment, the oxygen produced by the co-electrolysis device may be supplied to the burner of the reformer.

According to the embodiment, the remaining gas from which the carbon dioxide has been separated by the carbon dioxide separator may be supplied to the burner of the reformer.

According to the embodiment, the hydrogen separator and the carbon dioxide separator may use pressure swing adsorption (PSA).

According to the embodiment, the co-electrolysis device may be supplied with power produced by using renewable energy.

Another embodiment is a natural gas reforming process including: a combustion step of burning fuel and generating combustion gas; a reforming step of being supplied with heat of the combustion gas and converting natural gas into reformed gas which comprises hydrogen and carbon monoxide, through a steam reforming reaction; a steam generation step of generating steam by heat-exchanging with the combustion gas; a water gas shift reaction step of converting the carbon monoxide and steam of the reformed gas into hydrogen and carbon dioxide through a water gas shift reaction; a hydrogen separation step of separating the hydrogen from the gas supplied from the water gas shift reaction step; a carbon dioxide separation step of separating the carbon dioxide from the gas which is supplied in the hydrogen separation step and from which the hydrogen has been separated; and a co-electrolytic reaction step of being supplied with the steam and the carbon dioxide separated in the carbon dioxide separation step and producing oxygen and syngas comprising hydrogen and carbon monoxide, through a co-electrolytic reaction.

According to the embodiment, the steam generated in the steam generation step may be supplied to the reforming step, the water gas shift reaction step, and the co-electrolytic reaction step, respectively.

According to the embodiment, at least a portion of the syngas produced in the co-electrolytic reaction step may be supplied as fuel to the combustion step.

According to the embodiment, the rest of the syngas produced in the co-electrolytic reaction step may be supplied to a preceding step of the water gas shift reaction step.

According to the embodiment, the oxygen generated in the co-electrolytic reaction step may be supplied to the combustion step.

According to the embodiment, the remaining gas from which the carbon dioxide has been separated in the carbon dioxide separation step may be supplied to the combustion step.

According to the embodiment, the hydrogen separation step and the carbon dioxide separation step may use pressure swing adsorption (PSA).

According to the embodiment, the co-electrolytic reaction step may be supplied with power produced by using renewable energy.

According to the embodiment of the present disclosure, the emission amount of carbon dioxide produced by reforming natural gas can be reduced by using a co-electrolysis device, and the separated carbon dioxide can be used as itself even without a separate storage space for isolating the carbon dioxide. In other words, it is possible to produce blue hydrogen with reduced greenhouse gas emissions from the natural gas reforming process.

In addition, it is possible to reduce the amount of natural gas used as fuel for combustion and to maintain the reaction temperature of the reformer by supplying a portion of the syngas generated by co-electrolysis to the reformer and by using it as fuel for combustion, and hydrogen is additionally produced by supplying the rest of the syngas to the front end of a water gas shift reactor, so that the production of the hydrogen can be increased.

The effect of the present disclosure is not limited to the above effects and should be construed as including all the effects that can be inferred from the configuration of the present disclosure disclosed in the detailed description or claims of the present disclosure.

DETAILED DESCRIPTION

Figure 1:
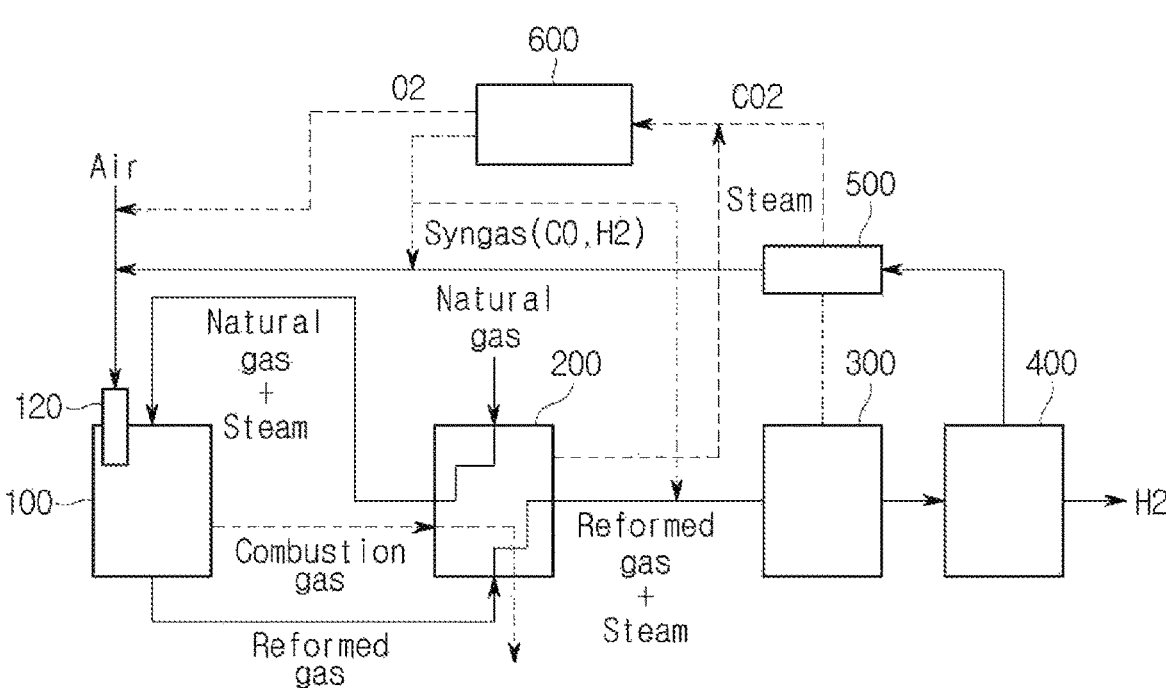
FIG. 1 is a schematic view showing a natural gas reforming system according to an embodiment of the present disclosure.

Hereinafter, preferred embodiments of a natural gas reforming system and a process thereof of the present disclosure will be described with reference to the accompanying drawings.

Also, the below-mentioned terms are defined in consideration of the functions in the present disclosure and may be changed according to the intention of users or operators or custom. The following embodiments do not limit the scope of the present disclosure and are merely exemplary of the components presented in the claims of the present disclosure.

Parts irrelevant to the description will be omitted for a clear description of the present disclosure. The same or similar reference numerals will be assigned to the same or similar components throughout this specification. Throughout this specification, when it is mentioned that a portion "includes" an element, it means that the portion does not exclude but further includes other elements unless specifically mentioned otherwise.

First, a natural gas reforming system according to an embodiment of the present disclosure will be described with reference to FIG. 1.

The natural gas reforming system according to the embodiment of the present disclosure may in general include a reformer 100, a steam generator 200, a water gas shift reactor 300, a hydrogen separator 400, a carbon dioxide separator 500, and a co-electrolysis device 600. The reformer 100, the steam generator 200, the water gas shift reactor 300, the hydrogen separator 400, the carbon dioxide separator 500 and the co-electrolysis device 600 may be in a form of a separate module, structure, device, or a physical part respectively where a physical or a chemical activity, action or step occurs or is performed or executed. Or, one or more of them may be a part of a single certain physical module, structure, device or system, in a gas related treatment system.

In the reformer 100, through a steam reforming reaction under catalytic action, natural gas is converted into reformed gas that includes hydrogen and carbon monoxide. Specifically, as shown in the following reaction equation (1), methane and steam may react and be converted into hydrogen and carbon monoxide. A reforming catalyst may include a catalyst in which a metal such as nickel, ruthenium, etc., is supported on a carrier such as alumina, silica, magnesium aluminate, etc.

$$CH_4+H_2O \rightarrow CO+3H_2 \qquad \text{Equation (1)}$$

Here, heat is required in order to establish the reaction equation (1) To this end, according to an embodiment, the reformer 100 may include a burner 120. The burner 120 burns fuel to generate combustion gas, thereby maintaining the reaction temperature of the reformer 100 between 600° C. and 900° C. Natural gas that is the same gas as gas to be reformed may be supplied as fuel to the burner 120 and burned. However, according to an embodiment of the present disclosure, as described below, syngas produced by the co-electrolysis device 600 may be supplied as fuel, so that the amount of natural gas used can be reduced.

According to an embodiment, the combustion gas discharged from the burner 120 of the reformer flows into the steam generator 200 and performs heat exchange with water, and thus, generates steam. The path of the combustion gas is indicated by a dash-single dotted line in FIG. 1. In addition, the natural gas supplied from the outside absorbs heat from the combustion gas while passing through the steam generator 200, is heated to a temperature suitable for the reforming reaction, is mixed with the generated steam, and then is supplied to the reformer 100.

According to an embodiment, the reformed gas generated in the reformer 100 not only supplies heat through the steam generator 200 but also is mixed with the steam and is supplied to the water gas shift reactor 300. In the water gas shift reactor 300, the steam and carbon monoxide of the reformed gas are converted into hydrogen and carbon dioxide through a water gas shift (WGS) reaction according to the following reaction equation (2).

$$CO+H_2O \rightarrow CO_2+H_2 \qquad \text{Equation (2)}$$

According to an embodiment, the water gas shift reactor 300 is charged with a shift catalyst for the water gas shift reaction. Copper based catalysts which are oxides such as copper-zinc (Cu—Zn—Al2O3 based catalyst) and/or iron-chromium (Fe2O3-Cr2O3 based catalyst), etc., may be preferably used as the shift catalyst. The reaction temperature of the Cu—Zn—Al2O3 based catalyst may be between 200° C. to 250° C., and the reaction temperature of the Fe2O3-Cr2O3 based catalyst may be between 300° C. to 450° C.

According to an embodiment, the gas with a higher hydrogen content through the water gas shift reaction is supplied to the hydrogen separator 400 from the water gas shift reactor 300. In the hydrogen separator 400, the hydrogen can be separated in high purity. The hydrogen separator 400 may use one or more of an adsorption method, a membrane separation method, and a cryogenic distillation method.

The embodiment will be described based on an embodiment using pressure swing adsorption (PSA). The PSA is a process of separating the hydrogen from an adsorbent by using a difference in the amount of adsorbed gas. The hydrogen separator 400 using the PSA can purify the hydrogen by adsorbing and removing impure gases other than the hydrogen through use of the adsorbent. Specifically, impurities are removed by adsorbing the impurities in a high-pressure state, and when pressure is reduced, the adsorbed materials are desorbed and regenerated.

According to an embodiment, the remaining gas from which the hydrogen has been separated by the hydrogen separator 400 may be supplied to the carbon dioxide separator 500. The carbon dioxide separator 500 may separate the carbon dioxide in high purity. Likewise, the carbon dioxide separator 500 may use, for example, the pressure swing adsorption (PSA), and may purify the carbon dioxide by adsorbing the carbon dioxide through use of the adsorbent. As such, since the hydrogen separator 400 and the carbon dioxide separator 500 are operated by pressure, low power consumption can be required.

According to an embodiment, the carbon dioxide separated by the carbon dioxide separator 500 is supplied to the co-electrolysis device 600, and steam is also supplied to the co-electrolysis device 600 from the steam generator 200. Accordingly, oxygen and syngas including hydrogen and carbon monoxide are produced from the carbon dioxide and steam through a co-electrolytic reaction, as shown in the following equation (3).

$$CO_2+2H_2O \rightarrow CO+2H_2+3/2O_2 \qquad \text{Equation (3)}$$

Here, the paths of the steam and carbon dioxide supplied to the co-electrolysis device 600 and the paths of the oxygen and syngas generated by the co-electrolysis device 600 are indicated by broken lines in FIG. 1.

Here, since electricity and heat are required in order for the reaction equation (3) to be made, power may be supplied from the outside and high-temperature steam may be supplied from the steam generator 200 according to an embodiment. In addition, it is a matter of course that heat may be supplied by combustion gas discharged from the burner 120 of the reformer or heat may be supplied from the outside according to an embodiment. Preferably, the co-electrolysis device 600 may be supplied with power produced by using renewable energy. According to an embodiment, since the co-electrolysis device 600 is operated at a high temperature, the amount of electricity required by the co-electrolysis device 600 may be much less than that required by an existing water electrolysis facility.

Figure 2:
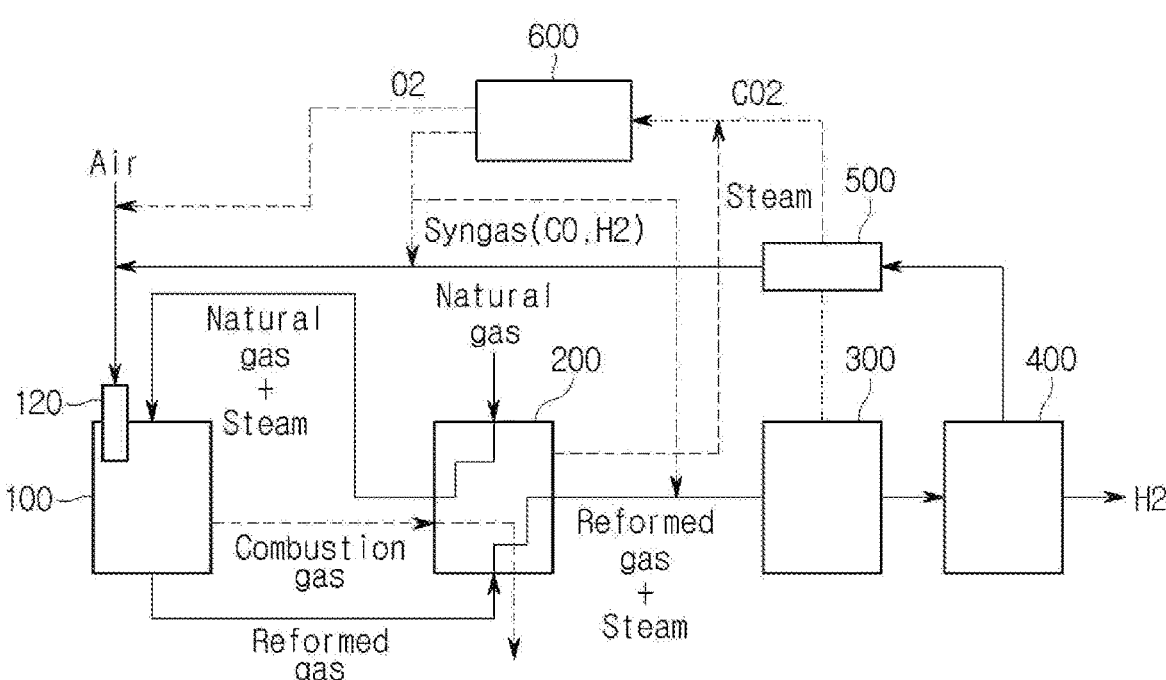
FIG. 2 is a schematic view showing solid oxide co-electrolysis (SOC) cells of a co-electrolysis device in the natural gas reforming system of FIG. 1.

Specifically, according to an embodiment, the co-electrolysis device 600 includes a solid oxide co-electrolysis cell shown in FIG. 2. The solid oxide co-electrolysis cell includes a cathode 620, an anode 640, and a solid oxide electrolyte 660 disposed therebetween. The carbon dioxide and steam are supplied to the cathode 620 and are, as shown in the following reaction equations (4) and (5), reduced respectively, and thus, hydrogen and carbon monoxide are generated. In addition, oxygen ions are pumped from the cathode 620 side and flow to the anode 640 side through the solid oxide electrolyte 660. In the anode 640, the oxygen ions are oxidized as shown in the reaction equation (6) below, and thus, oxygen is generated.

$$H_2O+2e^- \rightarrow^{H}_2+O^{2-} \qquad \text{Equation (4)}$$

$$CO_2+2e^-=\rightarrow CO+O^{2-} \qquad \text{Equation (5)}$$

$$O^{2-} \rightarrow 1/2O_2+2e^- \qquad \text{Equation (6)}$$

According to an embodiment, a portion of the syngas generated by the co-electrolysis device 600 may be supplied as fuel to the burner 120 of the reformer and may be combusted, thereby reducing the amount of natural gas used as fuel for combustion and maintaining the reaction temperature of the reformer 100.

In addition, according to an embodiment, the syngas remaining after being supplied to the burner 120 is supplied to the front end of the water gas shift reactor 300, so that additional hydrogen production is possible through the water gas shift reactor 300 and the hydrogen separator 400. As a result, it is possible to increase the hydrogen production.

Oxygen generated by the co-electrolysis device 600 may also be supplied to the burner 120 of the reformer and may be used for combustion of the syngas.

Also, the remaining gas from which the carbon dioxide has been separated by the carbon dioxide separator 500 may also be supplied to the burner 120 of the reformer and may be used, together with the syngas, as fuel for combustion.

Figure 3:
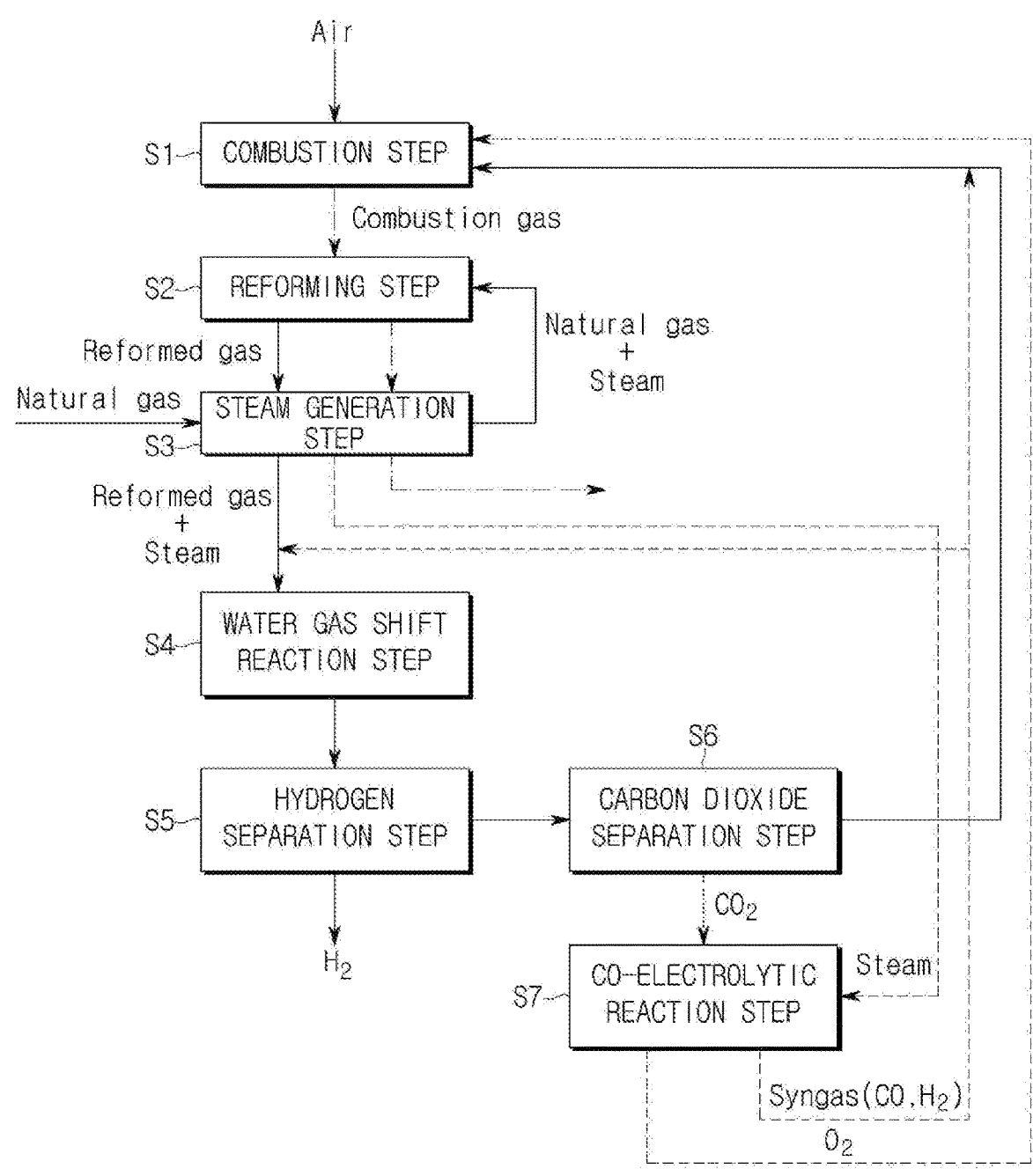
FIG. 3 is a flowchart showing a natural gas reforming process according to an embodiment of the present disclosure.

Next, a natural gas reforming process according to an embodiment of the present disclosure will be described with reference to FIG. 3.

The natural gas reforming process according to an embodiment of the present disclosure may in general include a combustion step S1, a reforming step S2, a steam generation step S3, a water gas shift reaction step S4, a hydrogen separation step S5, a carbon dioxide separation step S6, and a co-electrolytic reaction step S7.

In the combustion step S1, as described in the burner 120 of the reformer, fuel is burned to generate combustion gas. The path of the combustion gas is indicated by a dash-single dotted line in FIG. 3.

In the reforming step S2, as described in the reformer 100, the heat of the combustion gas generated in the combustion step S1 may be supplied and natural gas may be converted, through a steam reforming reaction, into reformed gas which includes hydrogen and carbon monoxide.

In the steam generation step S3, as described in the steam generator 200, heat may be supplied to the reforming step S2 and by way of heat-exchanges with the discharged combustion gas, the steam may be generated. The steam generated in the steam generation step S3 is supplied to the reforming step S2, the water gas shift reaction step S4, and the co-electrolytic reaction step S7 respectively.

In the water gas shift reaction step S4, as described in the water gas shift reactor 300, the steam and carbon monoxide of the reformed gas may be converted into hydrogen and carbon dioxide through the water gas shift reaction.

In the hydrogen separation step S5, as described in the hydrogen separator 400, the hydrogen may be separated from the gas that is supplied in the water gas shift reaction step S4.

In the carbon dioxide separation step S6, as described in the carbon dioxide separator 500, carbon dioxide may be separated from the gas which is supplied in the hydrogen separation step S5 and from which the hydrogen has been separated. As described above, according to an embodiment, the hydrogen separation step S5 and the carbon dioxide separation step S6 may use the pressure swing adsorption (PSA).

In the co-electrolytic reaction step S7, as described in the co-electrolysis device 600, the carbon dioxide separated in the carbon dioxide separation step S6 and the steam generated in the steam generation step S3 may be supplied, and then oxygen and syngas including hydrogen and carbon monoxide may be produced through the co-electrolytic reaction. Here, in the co-electrolytic reaction step S7, power produced by using renewable energy may be supplied for the co-electrolytic reaction. Here, the paths of carbon dioxide and steam supplied to the co-electrolytic reaction step S7 and the paths of the syngas and oxygen generated in the co-electrolytic reaction step S7 are indicated by broken lines in FIG. 3.

According to an embodiment, a portion of the syngas generated in the co-electrolytic reaction step S7 may be supplied to the combustion step S1 as fuel for combustion, thereby reducing the amount of natural gas used as fuel for combustion and maintaining the reaction temperature of the reforming step S2. Also, according to an embodiment, the syngas remaining after being supplied to the combustion step S1 may be supplied to the preceding step of the water gas shift reaction step S4, and may make it possible to produce additional hydrogen through the water gas shift reaction step S4 and the hydrogen separation step S5.

The oxygen generated in the co-electrolytic reaction step S7 may also be supplied to the combustion step S1 and may be used for combustion of the syngas.

Also, the remaining gas from which the carbon dioxide has been separated in the carbon dioxide separation step S6 may also be supplied to the combustion step S1 and may be used, together with the syngas, as fuel for combustion.

According to the embodiment of the present disclosure, the emission amount of carbon dioxide produced by reforming natural gas can be reduced by using a co-electrolysis device, and the separated carbon dioxide can be used as itself even without a separate storage space for isolating the carbon dioxide. In other words, it is possible to produce blue hydrogen with reduced greenhouse gas emissions from the natural gas reforming process.

The present invention is not limited to the described specific embodiments and descriptions described above. Various modifications can be made by anyone skilled in the art without departing from the subject matter of the present invention as defined by the appended claims. Such modifications fall within the scope of protection of the present invention.

What is claimed is:

1. A natural gas reforming system comprising:
a reformer configured to convert, through a steam reforming reaction, natural gas into reformed gas that comprises hydrogen and carbon monoxide;
a steam generator configured to generate steam by heat-exchanging with combustion gas that is discharged from a burner of the reformer;
a water gas shift reactor configured to convert the carbon monoxide and steam of the reformed gas into hydrogen and carbon dioxide through a water gas shift reaction;
a hydrogen separator configured to separate the hydrogen from the gas supplied from the water gas shift reactor;
a carbon dioxide separator configured to separate the carbon dioxide from the gas which is supplied by the hydrogen separator and from which the hydrogen has been separated; and
a co-electrolysis device configured to be supplied with the steam and the carbon dioxide separated by the carbon dioxide separator and to produce oxygen and syngas comprising hydrogen and carbon monoxide, through a co-electrolytic reaction,
wherein at least a portion of the syngas produced by the co-electrolysis device is supplied to the burner of the reformer and is combusted, and
wherein the rest of the syngas produced by the co-electrolysis device is supplied to a front end of the water gas shift reactor.

2. The natural gas reforming system of claim 1, wherein the steam generated by the steam generator is supplied to the reformer, the water gas shift reactor, and the co-electrolysis device, respectively.

3. The natural gas reforming system of claim 1, wherein the oxygen produced by the co-electrolysis device is supplied to the burner of the reformer.

4. The natural gas reforming system of claim 1, wherein the remaining gas from which the carbon dioxide has been separated by the carbon dioxide separator is supplied to the burner of the reformer.

5. The natural gas reforming system of claim 1, wherein the hydrogen separator and the carbon dioxide separator use pressure swing adsorption (PSA).

6. The natural gas reforming system of claim 1, wherein the co-electrolysis device is supplied with power produced by using renewable energy.

* * * * *